United States Patent [19]
Giachino

[11] 3,916,365

[45] Oct. 28, 1975

[54] INTEGRATED SINGLE CRYSTAL PRESSURE TRANSDUCER

[75] Inventor: Joseph M. Giachino, Alliance, Ohio

[73] Assignee: Bailey Motor Company, Wickliffe, Ohio

[22] Filed: Sept. 28, 1973

[21] Appl. No.: 401,759

Related U.S. Application Data

[63] Continuation of Ser. No. 222,213, Jan. 31, 1972, abandoned.

[52] U.S. Cl. .................... 338/2; 73/88.5 SD; 338/5

[51] Int. Cl. .................................... G01l 1/22

[58] Field of Search .................................... 338/2–6; 73/88.5 SD; 148/175; 117/234 M, 106; 29/620; 357/26, 80

[56] References Cited

UNITED STATES PATENTS

| | | | |
|---|---|---|---|
| 3,393,088 | 7/1968 | Manasevi et al. | 117/106 |
| 3,515,576 | 6/1970 | Manasevit | 148/175 X |

OTHER PUBLICATIONS

K. H. Zaininger et al., *MOS and Vertical Junction Device Characteristics of Epitaxial Silicon on Low Aluminum-Rich Spinel,* "Solid-State Electronics," 1970, Vol. 13, pp. 943–950.

*Primary Examiner*—C. L. Albritton
*Attorney, Agent, or Firm*—Joseph M. Maguire

[57] ABSTRACT

A single crystal piezoresistive material is epitaxially grown on a single crystal dielectric substrate. The piezoresistive material is then selectively removed from the substrate to form a crystallographically oriented sensor in conjunction with the substrate, which sensor changes resistance in response to pressure applied to the substrate. An integrated single crystal transducer is produced thereby with the sensor element electrically isolated by the dielectric substrate.

8 Claims, 3 Drawing Figures

INTEGRATED SINGLE CRYSTAL PRESSURE TRANSDUCER

This is a continuation of application. Ser. No. 222,213, filed Jan. 31, 1972 now abandoned.

BACKGROUND OF THE INVENTION

1. Field of the Invention

This invention relates to single crystal pressure transducers in general and more particularly to a single crystal piezoresistive sensor epitaxially grown on a dielectric substrate single crystal and a method of producing it.

2. Description of the Prior Art

Transducers which produce a resistance change in response to an applied pressure change have heretofore included wire and thin film strain transducers as well as semiconductor transducers.

Wire and thin film strain transducers have been mounted directly to the surface being measured by various adhesive means such as epoxing, brazing or welding. This causes hysteresis and creep problems in the transducer output signal due to the impossibility of obtaining a perfect bond with the measured surface when using these adhesive means. These adhesive means are also susceptible to failure from weathering, temperature cycling, and stress.

Semiconductor transducers are known wherein the sensing portion of the transducer is diffused in a wafer of semiconductor material. The diffused strip is of opposite type material from that of the wafer. As an example, a n-type silicon may have a p-type region diffused into it to form a pn junction. The p-type region is the piezoresistor and the n-type material is the substrate. Although this is an integrated single crystal transducer, it depends on the pn junction for electrical isolation. The pn junction must be back biased to assure proper electrical isolation.

The presence of such a junction also limits the possible uses of this type of transducer.

A junction transducer is limited as to the ambient temperatures in which it can operate. As ambient temperature increases, the junction becomes leaky and is unable to provide the electrical isolation necessary for proper operation of the transducer.

A junction transducer is also inappropriate for use in ambients where nuclear radiation is present. The junction is highly susceptible to nuclear radiation which disrupts the junction and ruins the transducer.

Because the junction transducer must be back biased to provide electrical isolation, it is incapable of handling AC voltages. The junction forms a diode which would pass either the positive or negative half of the AC cycle thus providing electrical isolation for only one-half the cycle.

The wafer material used for diffusing the junction, is also susceptible to many process fluids. As an example silicon has very little resistasnce to NaOH. This prevents the transducer from coming in direct contact with the fluid measured and requires complicated and costly intermediary seals.

SUMMARY OF THE INVENTION

In accordance with the present invention there is provided an integrated single crystal pressure transducer having an electrically insulating substrate of single crystal dielectric material on which a piezoresistive material is epitaxially grown to form an integrated single crystal. The piezoresistive material is molecularly bonded and oriented to the substrate and changes resistance in response to a pressure differential applied to the crystal. The substrate may be a cube of substantially identical faces allowing the transducer to respond in an identical manner to a signal on any of the cube faces.

Further in accordance with the invention, the integrated transducer has transducer signal modifying means bonded to the substrate for enhancing the output suitability of said transducer signal. The piezoresistive material may be a p-type silicon formed as two perpendicular strips and aligned with respect to the substrate, which may be spinel, to make one of the strips electrically insensitive to pressure differentials applied to the crystal and the other strip electrically sensitive. Prior to a pressure differential being applied to the crystal, both orthogonal strips are of substantially equal resistance.

Further in accordance with the invention, there is provided a method of producing single crystal transducers. An epitaxial layer of single crystal piezoresistive material is grown on a single crystal dielectric substrate. The piezoresistive material is next selectively removed in a predetermined pattern to form a sensing element in a pressure sensitive region of the substrate. Conductive runners are then deposited on the ends of the sensing element to be in electrical contact with it and to provide a monitoring means for the sensing element. The selective removal of the piezoresistive material is accomplished as follows. The piezoresistive material is coated with aluminum. An area defining the sensor is then coated with an acid resistant layer. The coated and uncoated aluminum layer is then acid etched to expose the piezoresistive material around the sensing element. The acid resistant layer is next removed from the sensing element and the exposed piezoresistive material is sputter etched to remove it from the substrate. Finally the sensing element is acid etched to remove the aluminum from it leaving only the sensing element on the substrate.

The invention as herein described eliminates the need for any adhesive means between the sensing element and the material sensed by having the piezoresistive sensor molecularly bonded to the substrate. This eliminates the hysteresis and creep problems associated with mounted wire and thin film transducers and produces a bond not susceptible to weathering, temperature cycling, or stress.

The invention as herein described has a doped piezoresistive material epitaxially grown and thereby molecularly bonded to a dielectric material. There is no junction formed between the sensor and the substrate since the substrate is an insulator. The invention therefore requires no back biasing to electrically isolate the arms of the sensor from each other. Due to this inherent electrical isolation, the invention is able to operate at higher ambient temperatures and offer a higher resistance to nuclear radiation than a semiconductor junction transducer. Unlike the junction transducer the invention may also operate on AC voltage.

By using spinel as a substrate the invention is resistant to NaOH attack and thus may be used to directly measure many process fluids without any intermediary protective seals.

The principal object of the invention is therefore to provide an integrated single crystal pressure transducer wherein each arm of the sensing element is molecularly bonded to the substrate while being electrically isolated from it as well as the other arms of the sensor.

A further object of the invention is to provide a cube shaped integrated single crystal pressure transducer which responds in a identical manner to a signal applied to any face of the cube.

A further object of the invention is to provide an integrated single crystal pressure transducer having transducer signal modifying means bonded to the substrate of the transducer and thus in close proximity to it.

A further object of the invention is to provide a transducer which is impervious to common process fluids and may be used directly in contact with them.

A further object of the invention is to provide an integrated single crystal pressure transducer able to operate on AC voltage.

DESCRIPTION OF THE PREFERRED EMBODIMENT

Figure 1:
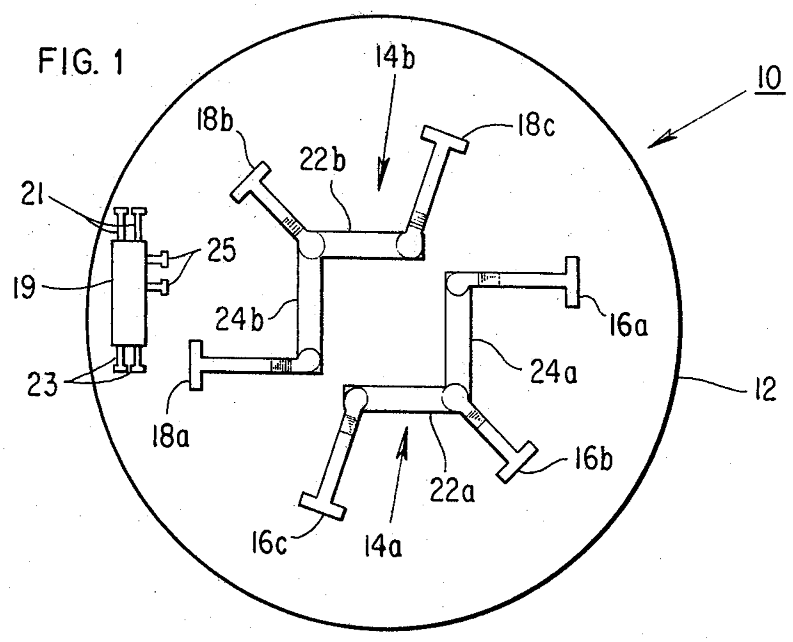
FIG. 1 is a top view representation of an integrated single crystal transducer with the piezoresistive sensor side shown.
Figure 2:
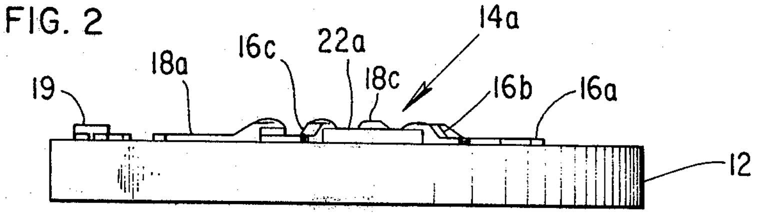
FIG. 2 is a side view of the transducer of FIG. 1.

Referring now to FIG. 1 and FIG. 2 wherein the showings are for purposes of explaining a preferred embodiment of the invention and not for purposes of limiting same, an integrated single crystal pressure transducer assembly 10 is shown having an anisotropic single crystal substrate 12 of high dielectric strength with perpendicular sensor assemblies **14*a***, 14*b*, formed from a single crystal piezoresistive material layer epitaxially grown on the substrate 12. Conductive runners 16, 18 are deposited on the substrate 12 to contact the ends and corners of the perpendicular sensor assemblies **14*a***, 14*b*. The substrate 12 is shown to be cylindrical but it could just as easily be manufactured in the form of a symmetrical pressure cube as described in the article "Self-Compensating Silicon Load Cell with an Electronic Converter" appearing in the October 1969 issue of IEEE TRANSACTIONS ON ELECTRON DEVICES, Vol. ED-16, No. 10, on pages 861–866 and depicted in FIG. 3.

The perpendicular assembly **14*a* is formed from the epitaxially grown layer to be in a relationship with the anisotropic substrate 12 so that a pressure sensitive resistor 22a and a pressure insensitive resistor 24*a* appear. The perpendicular assembly 14*b* is similarly formed to produce a pressure sensitive resistor 22*b* and a pressure insensitive resistor 24*b*. A signal modifying device 19 such as a semiconductor preamplifier is bonded to the substrate 12 although it could also be epitaxially grown on the substrate 12. The device 19 is electrically connected as is well known to those skilled in the art (not shown) to the piezoresistors 22, 24 through contacts 25 to modify their output in a manner desired. The device 19 is electrically powered by supplying an appropriate power source (not shown) to leads 21. The modiified piezoresistor output signal is outputed at leads 23** which may be connected to an appropriate indicating or control system.

Although any high dielectric strength substrate could be utilized, such as sapphire, to epitaxially grow a piezoresistive material onto itself, good results have been obtained with spinel as the substrate 12 and p-type silicon as the piezoresistive material. Both silicon and spinel are face centered cubic crystals which have a good crystal lattice match and compatible coefficients of thermal expansion.

Spinel is common as a solid mixture of $Mg0$ and $Al_2 0_3$ and is a good insulator which is commercially available as flame-fusion or Czochralski grown single crystals. A silicon single crystal may be epitaxially grown on any face of such a spinel crystal. A $2\mu$ silicon epitaxial p-type layer grown on the (1,1,1) face of a 20 mil thick spinel substrate is commercially available and may be purchased from Union Carbide Co. as an integrated wafer.

To produce an integrated single crystal pressure transducer from the above described wafer the following process is utilized.

The wafer is coated with evaporated aluminum and this aluminum coating is then covered with an acid resistant layer in the region outlining the sensor orientation desired. The wafer is next placed in an acid etch which removes the aluminum and exposes the silicon everywhere except for the outlined sensor element which is covered with the acid resistant layer. This acid resistant layer is now removed to expose the aluminum covered sensor and the whole wafer is either acid or sputter etched. In sputter etching aluminum sputters very slowly in comparison to silicon. The silicon is thus removed and the spinel is exposed everywhere except under the aluminun. The wafer is then acid etched to remove any residual aluminum remaining on the sensor leaving a spinel diaphragm with a sensor in molecular contact and orientation with it. Aluminum runners are now deposited on the spinel to contact the silicon and function as electrical contact points. The signal modifying device 19 is now bonded to the substrate 12 in a manner known to those skilled in the art; epoxying, brazing, etc.

The sensor outline was chosen to be a pair of perpendicular sensors along the anisotropic crystallographic orientation of the spinel whereby only one leg of each perpendicular pair of sensors is pressure sensitive.

In operation, the transducer 10 may be utilized as the sensing element of many process pressure transmitters as are well known to those familiar with the art. The spinel substrate 12 is impervious to many process fluids such as NaOH and may be used as the sensing diaphragm of the transmitter directly sensing the pressure of the process fluid.

The readout and monitoring means of the transducer 10 may take the form of a standard Wheatstone bridge arrangement with the resistors 22, 24 acting as the four arms of such a bridge. This type of configuration and its hook-up is well known to those familiar with the art. The readout and monitoring means could also take the form of a "L" type resistance bridge by utilizing either perpendicular sensor assembly **14*a* or 14*b*. The "L" type resistance bridge is described as U.S. Patent Application Ser. No. 22,977 filed Mar. 26, 1970 by John C. Martin et al; now Pat. No. 3,646,815. The output of the readout and monitoring means is then connected to the signal modifying device 19** as is well known to those familiar with the art to produce a signal capable of being used in a control system.

Figure 3:
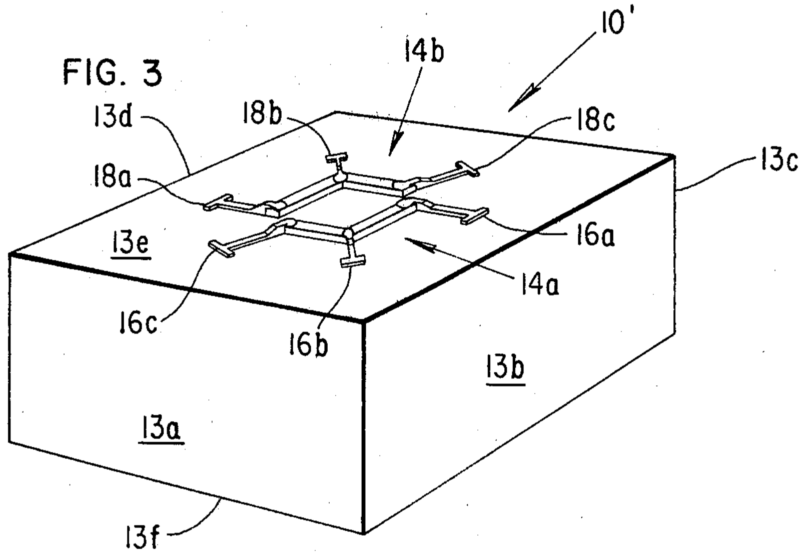
FIG. 3 is a perspective view of an alternate embodiment.

Referring to FIG. 3, a cube shaped transducer 10' has substantially equal area faces 13 comprising the substrate region. The piezoresistive sensor assemblies 14 are epitaxially grown on face 13e of the transducer 10' although they could just as easily be grown on any of the faces 13.

The advantage of the cube transducer 10' is that a pressure signal applied to any of the faces 13 of the cube perpendicular to the piezoresistor 14 pattern will produce a substantially identical change in resistance from the piezoresistive sensors 14. This makes the cube transducer 10' especially adaptable to use in ΔP transmitters.

Various modifications will become obvious to persons skilled in the art upon reading this specification. As an example of such modifications, the sensor orientation could be varied with respect to the substrate 12 to take any advantage of the anisotropic properties of the substrate desired. Thermistors could be formed on the substrate or epitaxial layer to provide temperature compensation to the transducer 10. It is my intention to include the various modifications mentioned and others in the scope of this application.

What I claim as new and desire to protect by letters patent of the United States is:

1. An integrated single crystal pressure transducer, comprising:

a substrate of single crystal dielectric material;

a single crystal piezoresistive material epitaxially grown on said substrate to form an integrated single crystal with said substrate; and said piezoresistive material occurring at regions of said substrate sensitive to the stress, whether tensive or compressive, caused by pressure applied thereto as a function of location on the substrate and the geometry thereof in order that said piezoresistive material mechanically and electrically responds to pressure applied to said integrated crystal.

2. An integrated single crystal pressure transducer as set forth in claim 1; wherein said substrate is a cube having substantially identical dimension faces to produce a substantially identical electrical response from said transducer upon application of a pressure to any of the faces of said cube perpendicular to said piezoresistive material pattern.

3. An integrated single crystal pressure transducer as set forth in claim 1; including transducer signal modifying means, bonded to said substrate and electrically coupled to the piezoresistive material for enhancing the output suitability of said transducer signal and wherein said piezoresistive material is a doped silicon.

4. An integrated single crystal pressure transducer as set forth in claim 1; wherein said peizoresistive material occurs on said substrate in the form of first and second perpendicular strips, said strips being aligned with respect to said substrate so that said first strip is electrically insensitive to pressure applied to said crystal and said second strip is electrically sensitive to pressure applied to said crystal.

5. An integrated single crystal pressure transducer as set forth in claim 4; wherein said first and second strips are of substantially equal resistance prior to a differential in pressure being applied to different faces of said crystal.

6. An integrated single crystal pressure transducer as set forth in claim 5; wherein said piezoresistive material is grown on a face of said substrate defined by the (1,1,1) crystallographic orientation.

7. An integrated single crystal pressure transducer as set forth in claim 6; wherein said substrate of dielectric material is spinel.

8. An integrated single crystal pressure transducer as set forth in claim 2, wherein said piezoresistive material pattern comprises a first piezoresistive strip and a second piezoresistive strip aligned with said substrate so that one of said strips is electrically insensitive to pressure applied to said substrate and the other of said strips is electrically sensitive to pressure applied to said substrate and wherein said strips are of substantially equal resistance prior to pressure being applied to said substrate.

* * * * *

PO-1050
(5/69)

UNITED STATES PATENT OFFICE
CERTIFICATE OF CORRECTION

Patent No. 3,916,365 Dated October 28, 1975

Inventor(s) Joseph M. Giachino

It is certified that error appears in the above-identified patent and that said Letters Patent are hereby corrected as shown below:

[73] Assignee: BAILEY METER COMPANY, Wickliffe, Ohio

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*